(12) United States Patent
Dove

(10) Patent No.: US 8,587,725 B2
(45) Date of Patent: Nov. 19, 2013

(54) METHOD OF DIGITAL SIGNAL PROCESSING

(75) Inventor: Thomas Dove, Bristol (GB)

(73) Assignee: Vidcheck Limited, Bristol (GB)

( * ) Notice: Subject to any disclaimer, the term of this patent is extended or adjusted under 35 U.S.C. 154(b) by 0 days.

(21) Appl. No.: 13/509,132

(22) PCT Filed: Nov. 10, 2010

(86) PCT No.: PCT/GB2010/051873
§ 371 (c)(1),
(2), (4) Date: May 10, 2012

(87) PCT Pub. No.: WO2011/058353
PCT Pub. Date: May 19, 2011

(65) Prior Publication Data
US 2012/0224104 A1    Sep. 6, 2012

(30) Foreign Application Priority Data

Nov. 11, 2009  (GB) .................................. 0919715.3

(51) Int. Cl.
*H04N 5/14* (2006.01)
*H04N 9/64* (2006.01)

(52) U.S. Cl.
USPC ........................................................ 348/575

(58) Field of Classification Search
USPC ........................................................ 348/575
See application file for complete search history.

(56) References Cited

U.S. PATENT DOCUMENTS

| | | | | |
|---|---|---|---|---|
| 5,691,779 A | * | 11/1997 | Yamashita et al. | 348/645 |
| 6,304,300 B1 | * | 10/2001 | Warren et al. | 348/674 |
| 6,570,577 B1 | * | 5/2003 | Callway et al. | 345/604 |
| 6,571,011 B1 | * | 5/2003 | Andresen et al. | 382/167 |
| 6,734,921 B1 | * | 5/2004 | McIntyre et al. | 348/708 |
| 6,798,902 B1 | * | 9/2004 | McIntyre et al. | 382/167 |
| 7,483,083 B2 | * | 1/2009 | Li et al. | 348/673 |
| 8,139,021 B2 | * | 3/2012 | Botzas et al. | 345/102 |
| 8,184,089 B2 | * | 5/2012 | Botzas et al. | 345/102 |
| 2002/0105526 A1 | * | 8/2002 | Gonsalves | 345/589 |
| 2008/0118172 A1 | * | 5/2008 | Kim | 382/260 |

(Continued)

FOREIGN PATENT DOCUMENTS

| | | |
|---|---|---|
| EP | 1524854 A1 | 4/2005 |
| EP | 1857976 A2 | 11/2007 |

OTHER PUBLICATIONS

Wikipedia, Dynamic range compression, Nov. 7, 2007, http://en.wikipedia.org/wiki/Dynamic_range_compression [accessed Jan. 20, 2010], printed May 10, 2012.

(Continued)

*Primary Examiner* — Brian Yenke
(74) *Attorney, Agent, or Firm* — Reising Ethington P.C.

(57) ABSTRACT

A method of digitally processing images and/or audio in the form of a plurality of data samples, each data sample having a value representative of a visual or audio property, the method comprising: identifying a first set of data samples having values outside a first predefined range of data values; identifying a second set of data samples having values outside a second predefined range of data values, the second predefined range being within the first predefined range; and applying a non-linear scaling algorithm to the data values of the first and second sets of data samples to generate a set of modified data samples having data values within the first predefined range.

11 Claims, 3 Drawing Sheets

Figure 1:
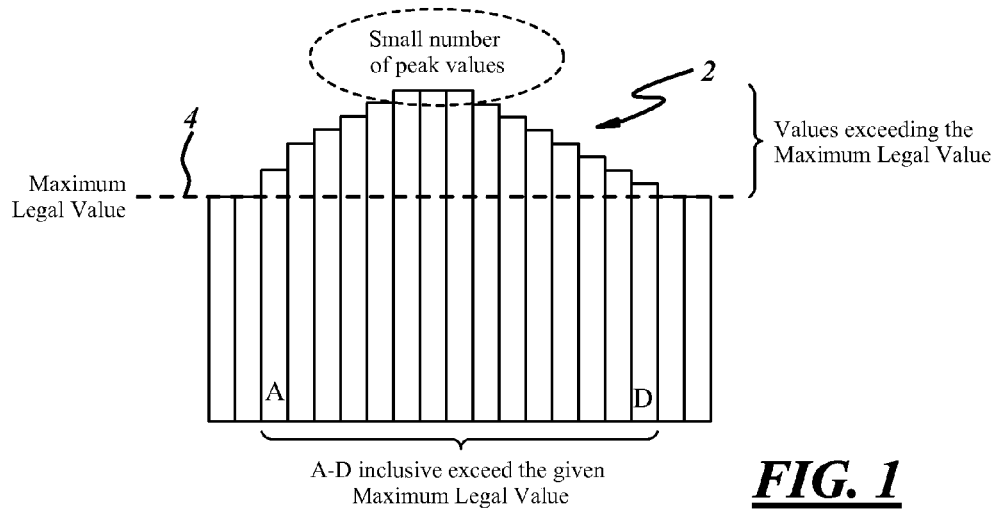

Histogram showing range of data samples where those from A-D inclusive all exceed the Upper Knee Value, but only those from B - C inclusive exceed the given Maximum Legal Value Histogram showing results of application of present invention: quantity of peak values remains the same (or similar) and there is a non linear adjustment in values which are above the Upper Knee Value, but are not 'illegal' (i.e. they are not above the Maximum Legal Value)

(56) References Cited

U.S. PATENT DOCUMENTS

| | | |
|---|---|---|
| 2009/0154798 A1 | 6/2009 | Mizukura et al. |
| 2009/0161020 A1* | 6/2009 | Barnhoefer et al. ........... 348/673 |
| 2009/0284540 A1* | 11/2009 | Higgins et al. ................ 345/581 |
| 2009/0284546 A1* | 11/2009 | Brown Elliott ............... 345/596 |
| 2010/0013751 A1* | 1/2010 | Kerofsky et al. ................ 345/89 |
| 2010/0053222 A1* | 3/2010 | Kerofsky ...................... 345/690 |
| 2010/0091032 A1* | 4/2010 | Ueki et al. .................... 345/590 |
| 2011/0115766 A1* | 5/2011 | Kerofsky et al. .............. 345/207 |
| 2011/0222767 A1* | 9/2011 | Mitsunaga .................... 382/169 |

OTHER PUBLICATIONS

Wikipedia, Limiting, Mar. 31, 2008, http://en.wikipedia.org/wiki/Limiting [accessed Jan. 20, 2010], printed May 10, 2012.

\* cited by examiner

Schematic of a video image with three 'connected areas'

Three 'connected areas'

———— Edge of the area inside which all pixels exceed the Maximum Legal Value in each connected area

- - - - - Edge of the area inside which all pixels exceed the Upper Knee Value in each connected area

METHOD OF DIGITAL SIGNAL PROCESSING

Digital video comprises digital data representing the images and separate digital data representing the audio signal. The digital data representing the images comprises a sequence of values equating to the components of a selected colour space. (Although such values are typically stored and transmitted in compressed form to reduce storage and bandwidth transmission requirements, the compressed representation can be decompressed to the colour space concerned: such compression/decompression is extraneous to the current invention.) Common colour spaces for video images include YUV (Y is luminance and U and V are colour differences) and RGB (red, green, blue). For audio, the digital data generally include values relating to the audio volume (similarly with the video, audio data is often compressed for storage/transmission but using different transmission schemes).

The broadcast specifications typically limit the range of values the audio and visual data are permitted to have, in other words, certain values are deemed "illegal". For example, for image data in the YUV colour space each of the YU and V components are typically represented by 8 bits and hence each have a theoretical range of 0-255. However, allowing for historical compatibility with analogue TV systems, where values of 0 and near 0 were for the synchronisation cycle and values at or near 255 were deemed "over-white", the Y component is typically limited to a range of 16-235 and the U and V components are limited to a range of 16-240. Similarly, the audio values can be too high, either over a short period of time "volume" or a longer period of time (average volume over a longer time, known as "loudness"). It is therefore generally desirable to limit or correct these "illegal" image and audio values prior to broadcast to within the "legal" range.

A simple solution to this issue is to linearly scale all of the audio and image values. For example, for the Y component of the image data (which is limited to 16-235) a scaling may be performed where the range of 0-255 is mapped to a smaller range of 16-235. This can also be applied to the U and V components, or alternatively for the RGB components in an RGB colour space, and also applied to the audio data. However, whilst this removes the "illegal" values, it has the undesirable effect of reducing the contrast and colour intensity across the whole picture, for all ranges of values, for the image data such that not only the over-bright highlights are reduced and the too-low dark areas are made lighter, but also that all intermediate values suffer reduction in contrast. This can be seen visually and is undesirable. Similarly, for audio data a linear scaling reduces the dynamic contrast of the audio in the middle and lower ranges of values, which is also undesirable.

An alternative approach to removing the "illegal" audio and image values is to simply "clamp" the illegal values down to the maximum permitted value. For example, for the Y component in image data all values from 236-255 would be clamped back down to the maximum limit of 235. However, the results of this technique are that the contrast in the image represented by the clamped data values is reduced and the size of the image area having the maximum permitted brightness is increased. This can produce visually undesirable artefacts in the broadcast images.

It would therefore be desirable to find an improved method of processing the digital data to remove the "illegal" image and audio values that either avoids or mitigates the undesirable aspects of the techniques discussed above.

According to a first aspect of the present invention there is provided a method of digitally processing images and/or audio in the form of a plurality of data samples, each data sample having a value representative of a visual or audio property, the method comprising identifying a first set of data samples having values outside a first predefined range of data values, identifying a second set of data samples having values outside a second predefined range of data values, the second predefined range being within the first predefined range, and applying a non-linear scaling algorithm to the data values of the first and second sets of data samples to generate a set of modified data samples having data values within the first predefined range.

The method may further comprise determining the maximum and minimum values of the plurality of data samples such that the non-linear scaling algorithm is dependant on one of the maximum or minimum data sample values.

The method may further comprise identifying a plurality of the first and second sets of the data samples wherein each first set of data samples is a subset of a corresponding second set of data samples and wherein each separate second set are temporally or spatially connected. Additionally, the method may further include determining the maximum and minimum data sample values within each of the first sets and applying a non-linear scaling algorithm dependant on each of the maximum or minimum values to a corresponding one of the first and second sets of data samples. Each second set of data samples may have a corresponding second predefined range of data values.

The non-linear scaling algorithm may be applied to corresponding first and second sets of data samples in one or more pluralities of data samples independently of the data values of the corresponding data sets.

The non-linear scaling algorithm may include at least one non-linear scaling factor. When the plurality of data samples represents image data, the non-linear scaling factor may be a gamma correction factor. Whereas when the plurality of data samples represents audio data, the non-linear scaling factor may be a logarithmic factor.

The method may further comprise, subsequent to identifying the first set of data samples, determining the number of data samples within the first set having values outside the first range of data values by no more than a predetermined margin and if the determined number of data samples is no more than a predetermined number then performing no further method steps, otherwise performing the remaining claimed method steps.

According to a second aspect of the present invention there is provided a computer program product comprising instructional data for causing data processing hardware to implement the above method.

Figure 2:
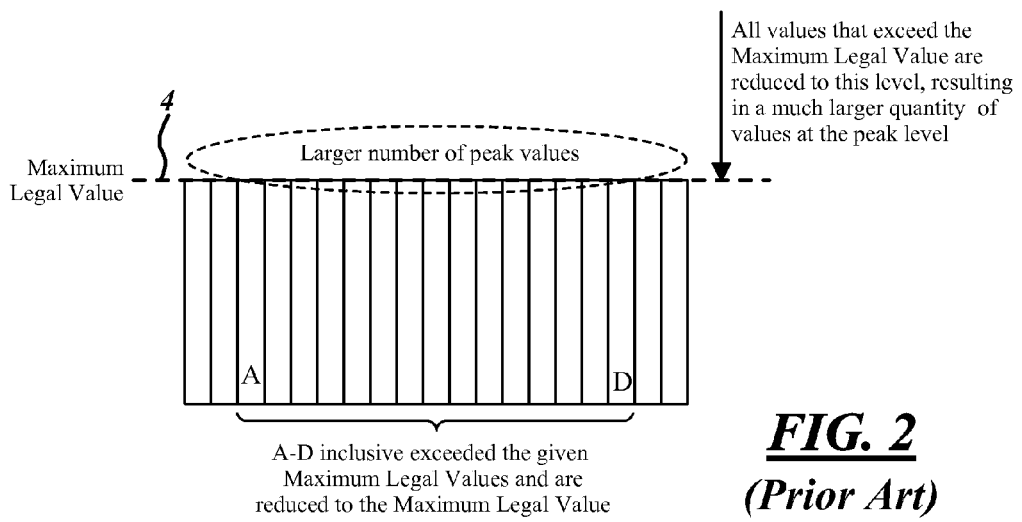
Figure 3:
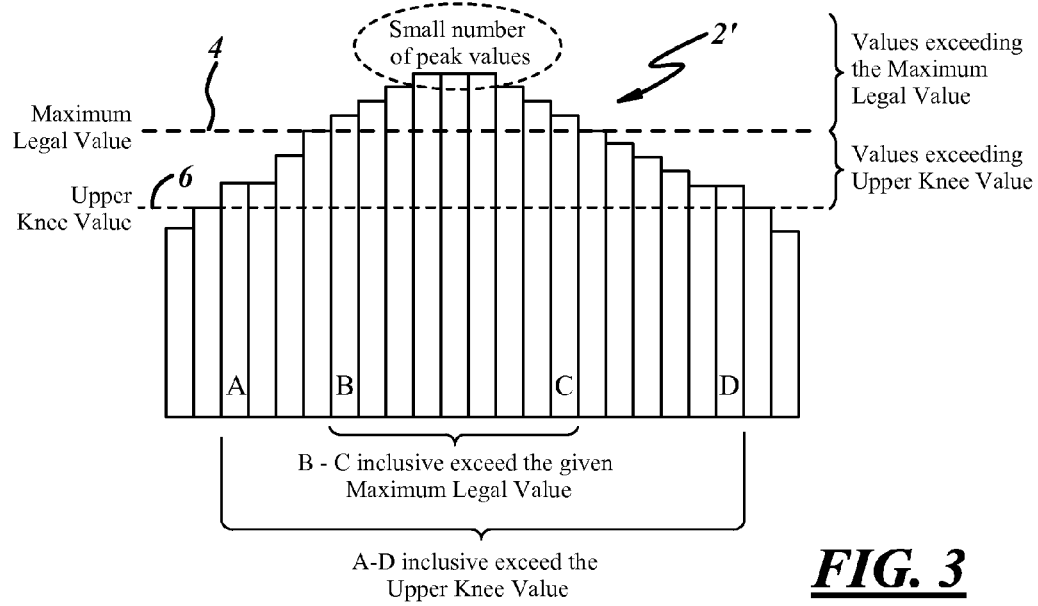
Figure 4:
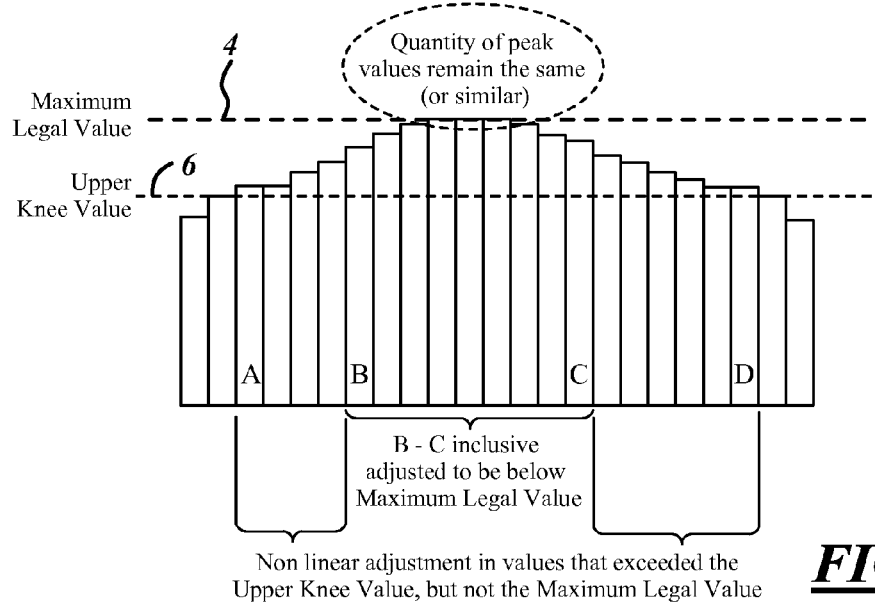
Figure 5:
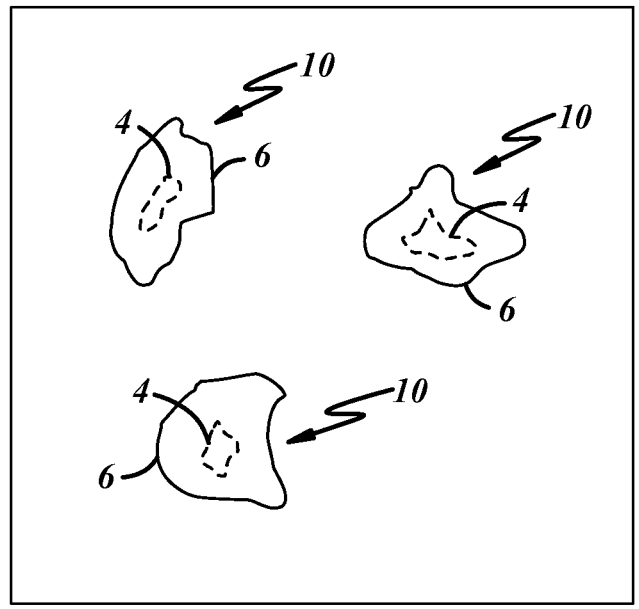

Embodiments of the present invention are described below, by way of non-limiting illustrative example only, with reference to the accompanying figures, of which:

FIG. 1 schematically illustrates a set of data samples having values exceeding illegal maximum value;

FIG. 2 schematically illustrates the data samples from FIG. 1 after prior art legalisation;

FIG. 3 schematically illustrates first and second sets of data samples prior to data processing according to the present invention;

FIG. 4 schematically illustrates the data samples of FIG. 3 after processing according to an embodiment of the present invention; and FIG. 5 schematically illustrates 'connected areas' according to embodiments of the present invention.

FIG. 1 schematically illustrates a set of data samples 2 of varying values. For example, the data values may represent luminance values (Y) from a video frame or amplitude levels in a digital audio signal. The dashed line 4 represents a predefined maximum legal value for the data samples 2. Consequently, for the set of data samples illustrated it can be seen that the set of samples A-D are above the maximum value and are therefore considered "illegal".

Under known prior art schemes, such as video legalisers, the maximum value of the set of samples A-D would simply be universally clamped back to the maximum value represented by the dashed line 4, as represented in FIG. 2. However, this has the undesirable effect of increasing the number of samples representing the permitted maximum value, as represented in FIGS. 1 and 2 by the circled data samples. As previously noted, this reduces the video or audio contrast, and which in the case of image data has the additional undesired effect of increasing the size of image area having a maximum permitted brightness (in the example of data samples representing luminance Y).

In embodiments of the present invention these disadvantages are addressed by applying a non-linear scaling algorithm to not only those data samples having illegal values but also a further set of data samples having data values beyond a second threshold value, referred to hereinafter as the knee value. FIG. 3 schematically illustrates a set of data samples 2' of various values. The upper legal value is indicated by the dashed line 4, such that the data samples B-C form a set of data samples having values exceeding this upper limit. The dotted line 6 represents the upper knee value, which lies below the upper legal value represented by the dashed line 4. Consequently, a broader set of data samples A-D have values exceeding the upper knee value. In embodiments of the present invention both the set of data samples having values exceeding the limit value and the further set of data samples having values between the knee value and upper legal value are identified and a non-linear scaling algorithm is applied to all of the data samples within both sets. FIG. 4 schematically illustrates those data samples corresponding to those shown in FIG. 3 after being digitally processed in accordance with embodiments for the present invention. As can be seen, all of the data values of the samples from A-D have been modified in value such that none of the data values has an "illegal" data value, i.e. all data values lie within the range of illegal data values delineated by the dashed line 4. By applying the non-linear scaling to both the illegal data values (B-C) and the additional set of data values lying between the knee value and upper legal value (A-B, C-D) local minimum or maximum in values are maintained. For example, in FIG. 3 the local maximum, shown circled, in the original unprocessed image (which may for example represent a local bright area in a video image) is preserved even after the processing according to embodiments in the present invention have been applied, as can be seen in FIG. 4 where the same three data values still represent a local maximum.

Whilst FIGS. 3 and 4 represent an example of data values exceeding a permitted maximum legal value, it will be appreciated that the converse situation is applicable for data values below permitted minimum legal values. In preferred embodiments of the present invention the data scaling is dependent upon the actual minimum and maximum values of the data samples, which must therefore be determined prior to application of the scaling algorithm.

The scaling algorithm may be based on any non-linear equation. An example of a suitable scaling equation is given below $$P_o = gm \times (P_i + (rf - ((P_i - ukv) \times ((mv - ulv)/(mv - ukv)))))$$

where;
$P_o$=output pixel value
gm=non-linear scaling factor
$P_i$=input pixel value
rf=rounding factor based upon the conversion of floating point values to integer, in the range of 0<rf<0.99
ukv=upper knee value
ulv=upper limit value
mv=maximum value The scaling factor gm may differ depending upon the original signal from which the data samples are derived. For example, if the original signal was a video signal (moving images) then the scaling factor may be equivalent to known "gamma correction" that is often applied to video values so that they look linear to the eye, although the digital values are not, since the human eye response to brightness is non-linear. In this situation the scaling factor gm may be based upon pixel values using standard gamma correction tables. Alternatively, where the original signal was an audio signal the scaling factor gm may be chosen to take into account the fact that a human response to audio levels is non-linear. In this situation the scaling factor gm may take into account the logarithmic response curve to audio loudness. Equally, where no further non-linear scaling factor is required the scaling factor gm may simply have a value of 1.

As will be appreciated, a converse equation is applied for scaling those data values below the minimum legal values.

As noted above, it is necessary to determine the maximum (or minimum) value of the data values to be scaled prior to applying the scaling algorithm. In a first embodiment of the present invention the maximum and/or minimum data values of all of the data samples can be determined before a uniform scaling algorithm is applied to the necessary individual data samples. For example, in the case of video images, the maximum and/or minimum data value for those data samples from an entire video frame may be determined before those single values are used in scaling all of the necessary data samples in that video frame. In an analogous fashion maximum or minimum values from the entirety of an audio signal may be determined before being applied to a single scaling algorithm for those audio samples beyond the maximum or minimum legal values. This is computationally easy and quick to implement in digital systems.

However, in further embodiments of the present invention an alternative strategy may be employed. Using again the example of video images, the pixel values (data sample values) are generally highly correlated within a video frame and from one video frame to the next such that there are typically ranges of pixel values that are similar within an image and these areas of similar pixel values move from one frame to the next. Consequently, the pixel values within the video data tends to change relatively gradually within an image and rather than single pixels there tends to be areas of high values and areas of low values that form a set of connected high (or low) pixel values for some parts of a particular video frame. This is illustrated schematically in FIG. 5, in which three "connected areas" 10 within an image are shown where the pixel values exceed the upper knee value, indicated by the solid lines, with the illegal (over-maximum) values shown inside these areas by the dotted lines. Consequently, an embodiment of the present invention the maximum/minimum data values for each individual "connected area" is determined and utilised in corresponding individual scaling algorithms, i.e. for any given "connected area" only the maximum/minimum values for that connected area are applied to the scaling algorithm and that scaling algorithm is only applied to the illegal values and values above the knee values for that particular connected area. This provides optimised scaling in each of the "connected areas" but is more computationally intensive.

In other embodiments of the present invention the concept of the "connected area" is taken one stage further. In the context of video data, the preceding and following frames for any given video frame are typically highly correlated, such that where an area gradually becomes brighter from one frame to the next (or darker), as is often the case, then the scaling of the present invention can be applied to the corresponding connected area in previous and subsequent video frames even if there are no pixel values in the previous or subsequent frames that are over the upper maximum value (or below the minimum value). This further visually improves the output video.

Single values for the upper and lower knee values may be used across multiple connected areas or alternatively different upper and lower knee values may be used for different connected areas.

Some broadcast specifications (e.g. from the European Broadcasting Union) specify a more 'lenient' limit e.g. the "YUV should be within the given range but up to 5% of an individual picture may exceed the range by +/−3%". This is accommodated by some embodiments of the present invention by firstly determining the number of identified data samples having values exceeding the upper or lower 'legal' limits by no more than the permitted additional margin, e.g. 3%. If the determined number of data samples is itself within the permitted additional margin, e.g. 5%, then no scaling takes place, otherwise the scaling methods as previously discussed are applied to scale all the samples exceeding the upper or lower limits. The additional sample value margins, e.g. 3%, will be predetermined by the broadcast standard and may vary from standard to standard and may have different values for the upper and lower 'legal' limits. Similarly, the number of data samples in any given data set, e.g. video frame, that may exceed these margins will vary between the different standards.

The invention claimed is:

1. A method of digitally processing images and/or audio in the form of a plurality of data samples, each data sample having a value representative of a visual or audio property, the method comprising:
   identifying a first set of data samples having values outside a first predefined range of data values;
   identifying a second set of data samples having values outside a second predefined range of data values, the second predefined range being within the first predefined range; and
   applying a non-linear scaling algorithm to the data values of the first and second sets of data samples to generate a set of modified data samples having data values within the first predefined range, wherein the non-linear scaling algorithm includes two or more non-linear scaling factors at least one of which is based on the non-linear response of the human eye in the case of image data and the non-linear response of the human ear in the case of audio data, characterised in that:
   subsequent to identifying the first set of data samples, determining the number of data samples within the first set having values outside the first range of data values by no more than a predetermined margin; and
   if the determined number of data samples is no more than a predetermined number then performing no further method steps, otherwise performing the remaining method steps.

2. The method of claim 1, wherein the method further comprises determining the maximum and minimum values of the plurality of data samples and wherein the non-linear scaling algorithm is dependant on one of the maximum or minimum data sample values.

3. The method of claim 1 further comprising identifying a plurality of the first and second sets of the data samples within a temporally connected series of visual images wherein each first set of data samples is in a spatially connected area and is a subset of a corresponding second set of data samples and wherein each separate second set are located in an spatially connected area in a subsequent or previous visual image where the corresponding locations of the first and second set at least partially overlap.

4. The method of claim 3, wherein the method further comprises determining the maximum and minimum data sample values within each of the first sets in a visual image and applying the said non-linear scaling algorithm to a corresponding one of the first and second sets of data samples from temporally previous or subsequent visual images, irrespective of whether the data sample values in the previous or subsequent visual images lie outside a first pre-defined range of values.

5. The method of claim 3, wherein each second set of data samples has a corresponding second predefined range of data values.

6. The method of claim 3, wherein the non-linear scaling algorithm is applied to corresponding first and second sets of data samples in one or more pluralities of data samples independently of the data values of the corresponding data sets.

7. The method of claim 1, wherein when the plurality of data samples represents image data, the non-linear scaling factor is a gamma correction factor.

8. The method of claim 1, wherein when the plurality of data samples represents audio data, the non-linear scaling factor is a logarithmic factor.

9. The method of claim 1, wherein the predetermined margin is within +/−3%.

10. The method of claim 1, wherein the predetermined number is up to 5%.

11. A computer program product comprising instructional data for causing data processing hardware to implement a method of digitally processing images and/or audio in the form of a plurality of data samples, each data sample having a value representative of a visual or audio property, the method comprising:
   identifying a first set of data samples having values outside a first predefined range of data values;
   identifying a second set of data samples having values outside a second predefined range of data values, the second predefined range being within the first predefined range; and
   applying a non-linear scaling algorithm to the data values of the first and second sets of data samples to generate a set of modified data samples having data values within the first predefined range, wherein the non-linear scaling algorithm includes two or more non-linear scaling factors at least one of which is based on the non-linear response of the human eye in the case of image data and the non-linear response of the human ear in the case of audio data, characterised in that:
   subsequent to identifying the first set of data samples, determining the number of data samples within the first set having values outside the first range of data values by no more than a predetermined margin; and if the determined number of data samples is no more than a predetermined number then performing no further method steps, otherwise performing the remaining method steps.

* * * * *